Dec. 30, 1969   H. ETTISCHER   3,486,431
FILM ADVANCING AND LOCKING MECHANISM FOR A PHOTOGRAPHIC CAMERA
Filed May 2, 1967
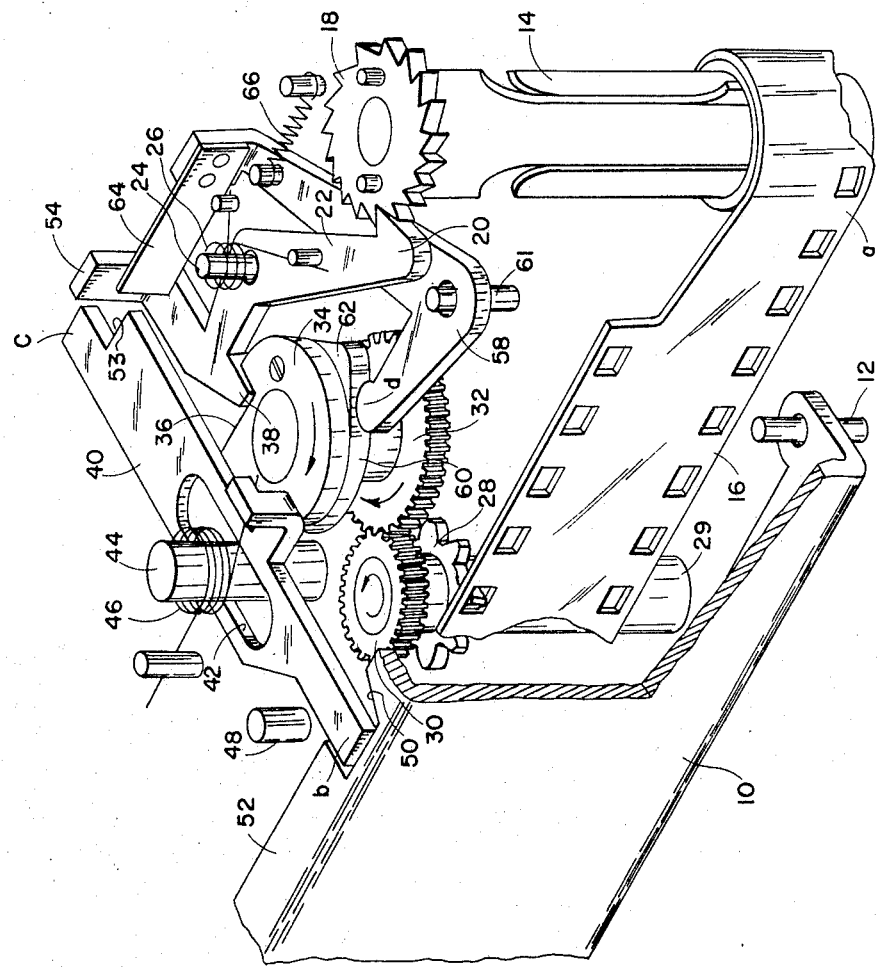
HELMUT ETTISCHER
*INVENTOR.*
BY *James A. Smith*
*Robert W. Hampton*
ATTORNEYS United States Patent Office 3,486,431
Patented Dec. 30, 1969

3,486,431
FILM ADVANCING AND LOCKING MECHANISM FOR A PHOTOGRAPHIC CAMERA
Helmut Ettischer, Ruit, kreis Eblingen, Germany, assignor to Eastman Kodak Company, Rochester, N.Y., a corporation of New Jersey
Filed May 2, 1967, Ser. No. 635,539
Claims priority, application Germany, May 14, 1966, K 59,258
Int. Cl. G03b 19/04
U.S. Cl. 95—31         12 Claims

ABSTRACT OF THE DISCLOSURE

A film advancing means is effective to advance a film relative to a camera film gate in predetermined metered steps. A releasable locking means is effective to lock the film advancing mechanism at the end of each step. Means responsive to movement of the camera back to a closed position are provided for temporarily disabling or delaying operation of the locking means during the initial advance step or movement of the film whereby the initial advance step is sufficient to position the first section suitable for exposure in alignment with the film gate.

---

This invention relates to photographic cameras and more particularly to an improved film advancing and locking mechanism for facilitating the initial advance of a film to position the first film section in position to be exposed.

Photographic still cameras typically include a film advancing and locking mechanism which when operated will advance a predetermined section of film into an exposure position relative to the film gate of the camera and then automatically lock to prevent further advance. In some cameras the mechanism is automatically unlocked in response to exposure of the film section whereupon the next film section may be advanced to an exposure position. In other cameras manual release of the mechanism is necessary after exposure before the next film section can be advanced.

While the above described locking feature is necessary to insure efficient use of the film and separation of the exposed film sections it complicates initial threading of the film in the camera. In many cameras threading is accomplished by securing the film leader portion to a take-up spool and then advancing the filmstrip a distance equal to several exposure sections after the camera back is closed to position the first film section suitable for exposure in alignment with the film gate. Heretofore, this operation has required the user to operate and manually release the advancing and locking mechanism several times to position the first film section suitable for exposure in the film gate of the camera. As a result of this inconvenience, the inexperienced user in many instances will not advance the film far enough or will advance the film too far resulting in loss of a picture or waste of film.

It is an object of the present invention to advance a film until the first film section suitable for exposure is located in the film gate and then to lock the film advancing mechanism.

Another object of the invention is to provide an improved film advancing and locking mechanism for facilitating initial advance of a film in a camera.

In accordance with the invention a film advancing means is effective to advance a film relative to a film gate in predetermined metered steps. A releasable locking means is effective to lock the film advancing mechanism at the end of each step. Means are provided for temporarily disabling or delaying operation of the locking means during the initial advance of the film whereby the initial advance step or movement of the film is sufficient to position the first section suitable for exposure in alignment with the film gate.

Other objects and advantages will become apparent from the following description taken in connection with the accompanying drawing which is a perspective view of a film advancing and locking mechanism in accordance with one embodiment of the invention.

Referring to the drawing a film advancing mechanism in accordance with the invention is depicted in association with those parts of a camera necessary for an understanding of the present invention. Parts of the camera not shown form no part of the present invention and may take various forms well known to those skilled in the art.

Referring specifically to the drawing there is shown a camera back 10 pivotally mounted on a pair of pivot pins 12 (one of which is shown in the drawing) which may be fixed to a main camera body or housing (not shown). By means of the pins 12 the camera back 10 may be pivotally displaced between open and closed positions relative to the camera housing. As will be apparent from the ensuing description the position of the parts shown in the drawing correspond to the closed condition of the camera back 10.

The camera mechanism further includes a rotatable take-up spool 14 which may be supported in one end of the camera housing (not shown) and to which the leader portion of a strip of sensitized film 16 may be secured in the manner shown in the drawing. The film 16 may be stored for example on a supply spool (not shown) or in a suitable cassette (not shown) in the opposite end of the camera and from which the leader portion may be withdrawn and attached to the take-up spool. Film advancement and transport may be accomplished by various known techniques such as by rotating the take-up spool to pull film from the supply spool or cassette.

During film advancement it is desired to meter the film movement and lock the film advancing mechanism after each new section to be exposed is advanced into alignment with the camera film gate (not shown). To accomplish this a ratchet wheel 18 may be fixed or functionally connected to one end of the take-up spool 14 to rotate therewith. The wheel 18 is arranged to be engaged by a pawl 20 formed on one end of a locking lever 22 which is supported for pivotal movement about a pivot pin 24. The lever 22 is biased to the locking position shown in the drawing by a suitable coil spring 26 encircling pin 24 and having end portions engaging suitable abutments or pins on the camera housing (not shown) and the lever 22 respectively as indicated in the drawing. In the locking position of lever 22 shown in the drawing, pawl portion 20 engages the ratchet wheel 18 and locks the spool 14 against rotation to thereby lock the film advancing mechanism. It will be apparent however that if locking lever 22 is pivoted clockwise about pin 24, the pawl portion 20 will be moved out of engagement with ratchet wheel 18 to release the take-up spool for rotation and thereby permit film advancement.

Referring now to the means for metering film advancement, a film perforation engaging sprocket 28 is positioned on one end of a film transport roller 29 rotatably mounted in the camera housing, and is positioned to be engaged and rotated by the film perforations during film advancement. A gear 30, coupled to the sprocket 28 to be rotatable therewith, meshes with and drives a second gear 32 also rotatably mounted within the camera housing. A control cam 34 is coupled or fixed to the gear 32 for rotation therewith and defines a generally circular periphery having a notch or recess 36 in one radial portion therof adapted to be engaged by a detent lug 38 formed on a locking lever 22. In the locking position of the locking lever 22 shown in the drawing, lug 38 is positioned in recess 36. If the locking lever 22 should be pivoted clockwise about pivot pin 24 (for example either manually or by a suitable mechanism associated with the shutter release mechanism) pawl 20 will move out of engagement with ratchet 18 and lug 38 will move out of engagement with recess 36. With the locking lever 22 so positioned the take-up spool 14 may then be rotated to advance the next film section into alignment with the camera film gate (not shown). Initial movement of the film 16 will cause rotation of cam 34 in a clockwise direction to move recess 36 past the end of lug 38 whereupon locking lever 22 may be released. Lug 38 will then ride on the circular peripheral surface of cam 34 with pawl 20 remaining displaced from the rachet wheel 18. At the end of one cam revolution recess 36 will again be aligned with lug 38 and locking lever 22 will pivot counterclockwise about pin 24 causing pawl 20 to again engage the ratchet wheel 18 and lock the take-up spool 14 against further rotation. Further rotation of cam 34 and sprocket 28 will be prevented by engagement of lug 38 with the edge of recess 36. A length of film is accordingly advanced corresponding to one complete revolution of cam 34. It will be apparent that by appropriately sizing the parts a length of film can be advanced corresponding to the length of a film section to be exposed.

The film advancing and locking means thus far described by way of example are well known in the art, and further description in regard to the structure and operation thereof is deemed to be unnecessary.

After initial attachment of the leader portion *a* to the take-up spool 14 it is necessary to advance the film 16 a distance equal to the length of several sections to be exposed after the camera back is closed to align the first section suitable for exposure with the film gate (not shown). With the particular film advancing and locking means shown in the drawing this operation has heretofore required the user to manually release locking lever 22 several times to permit several revolutions of cam 34 during this initial film movement. To eliminate this operation means are provided for temporarily disabling the locking mechanism during the initial film advance after closing of the camera back 10 subsequent to the insertion of a new supply spool or cassette.

This disabling means includes an elongated lever 40 having an elongated slot 42 intermediate the ends thereof adapted to receive a pin 44 suitably fixed relative to the camera housing (not shown). By means of the pin 44 and slot 42 the lever 40 may be both slidably and pivotally positioned relative to the pin 44. A coil spring 46 encircles the pin 44 and has the end portions thereof engaging suitable abutments associated with, for example, the camera housing and the lever 40 respectively whereby the spring 46 biases the lever 40 both axially toward the camera back 10 and angularly toward engagement with a stop pin 48. As will later be described in more detail, the lever 40 has three basic positions during operation of the disabling means and the film advancing and locking mechanism. In the position shown in the drawing the end portion *b* of the lever 40 is received by a recess or cutout 50 in the edge flange 52 of the camera back 10, the tip of the end portion *b* engaging the bottom edge of the recess 50 under the bias of spring 46. If the camera back 10 should be pivotally displaced from the position shown in the drawing to an open position relative to the camera housing, the lever 40 will move axially forward and at the same time pivot clockwise to a second position wherein it engages stop pin 48 under the bias of spring 46. When the cover plate 10 is subsequently closed the edge of the flange 52 will engage the end portion *b* of the lever 40 to displace the lever 40 axially to a third position.

The opposite end portion *c* of the lever 40 is provided with a recess or cutout 53 formed by removal of one corner portion thereof which is cooperative with an upturned end portion 54 of the locking lever 22. More specifically, when the lever 40 is in the first position described above wherein end portion *b* is received by recess 50 in the closed position of the cover, recess 53 will permit unrestricted displacement of the locking lever 22 during the operation of the film advancing and means previously described. However, when the lever 40 is positioned in the second position and then displaced axially to its third position by closing of cover 10 the tip of end potrion *c* of the lever 40 will engage end portion 54 of lever 22 to pivot locking lever 22 clockwise about pin 24 against the bias of spring 26 to thus prevent the lug 38 from engaging the recess 36 in the periphery of cam 34. When so positioned lever 22 will be unable to perform the locking function hereinbefore described.

Means are provided for releasing locking lever 22 from the aforementioned disabled position thereof. This means comprises a release lever 58 mounted for pivotal movement about a pivot pin 61 fixed relative to the camera housing (not shown). One end portion *d* of the lever 58 engages the periphery of a cam 60 coupled to and rotatable with the cam 34 and having a generally circular periphery defining a single lobe 62. The other end of the release lever 58 has an actuating bar 64 suitably fixed thereto and positioned to engage and pivot the lever 40 counterclockwise relative to pin 44 upon counterclockwise pivotal displacement of release lever 58 relative to pin 61. A coil spring 66 is mounted in tension between a pin carried by the lever 58 and a pin fixed relative to the camera housing to bias the lever 58 in a clockwise direction relative to pin 61, the biasing force being sufficient to cause end portion *d* of lever 58 to continuously engage and ride on the peripheral surface of cam 60. The arrangement is such that when end portion *d* of lever 58 engages the circular peripheral portion of cam 60, lever 58 will be positioned as shown in the drawing and the actuating bar 64 cannot engage lever 40. However, if the end portion *d* is displaced by cam lobe 62, while the end portion *c* of lever 40 engages portion 54 of locking lever 22 in the third position of lever 40 described above, actuating bar 64 will be displaced into engagement with lever 40 to displace the later counterclockwise relative to pin 44 to cause the end portion *b* of lever 40 to engage recess 50 and to cause the end portion *c* of lever 40 to move out of engagement with portion 54 of locking lever 22 to thereby release locking lever 22.

Operation

In operation of the mechanism described above, during normal film advance, the metering and locking means comprising sprocket 28, gears 30 and 32, cam 34, locking lever 22, ratchet 18 and take-up spool 14 will function in the manner described above to effect metered advance of the film through the camera in predetermined steps. The disabling means comprising levers 40 and 58, and cam 60 will be ineffective, the levers 40 and 58 assuming the positions shown in the drawing during normal film advance operation of the film advancing and locking mechanism.

After a film has been exposed and rewound, the camera back 10 is pivoted counterclockwise on pivot pins 12 to an open position whereupon the supply spool or cassette containing the exposed film is removed from the camera, and a new spool or cassette is inserted. The end of the leader portion is then suitably attached to the take-up spool 14.

As the camera back 10 is initially opened during the reloading operation, end portion *b* of lever 40 will be disengaged from recess 50 and lever 40 will simultaneously move axially forward and clockwise relative to pin 44 under the bias of spring 46 to the second position thereof hereinbefore described wherein end portion *c* of lever 40 is aligned with upturned portion 54 of locking lever 22 and end portion *b* of lever 40 is out of alignment with the recess 50. When the camera back 10 is subsequently closed, flange 52 will engage end portion $b$ of lever 40 to displace the lever 40 axially and thereby cause the end portion $c$ thereof to engage and displace end portion 54 of lever 22. As a result, lever 22 will be pivoted clockwise about pin 25 against the bias of spring 46, and lug 38 will be positioned away from cam 34 to thus terminate the functional connection between locking lever 22 and cam 34.

After closing of the camera back 10 the film advancing mechanism is operated by the user to rotate the take-up spool 14 and position the first film section which can be exposed into alignment with the film gate. Due to the absence of perforations on one side of the leader portion of the film 16, the metering wheel 28, gears 30 and 32 and cam 34 are not rotated during the initial film advance movement. After a film advance movement equal to about the length of one film section has been transported, the first perforation in the edge of the film adjacent the sprocket 28 will engage the sprocket 28 and rotate the same to cause clockwise rotation of cams 34 and 60. After about one cam revolution, the lobe 62 of cam 60 will be positioned as shown in the drawing to engage follower portion $d$ of lever 58. Further rotation of the cam 60 will effect counterclockwise pivotal displacement of lever 58, and the actuating bar 64 will engage and displace lever 40 counterclockwise relative to pin 44. When the end portion $b$ of lever 40 becomes aligned with recess 50 during such counterclockwise displacement, the lever 40 will move axially toward the cover plate and thus assume the position shown in the drawing. In this position the recess 52 is aligned with upturned portion 54 of locking lever 22, accordingly, and the functional connection of the latter with the cam 34 is re-established. Lug 38 will thus engage the surface of the cam 34 under the bias of the spring 26.

Further advancement of the film will rotate cam 60 approximately another revolution until recess 36 becomes aligned with lug 38, whereupon locking lever 22 will pivot counterclockwise to position lug 38 into the recess and pawl 20 in engagement with the ratchet wheel 18 to thus lock the film advancing mechanism.

By suitably arranging the relative positions of the lobe 62 of cam 60 and recess 36 of cam 34 and appropriately sizing the parts the film can be advanced from two to three advance steps before the locking mechanism becomes operative to lock the advance mechanism. Thus, the first film section capable of being exposed can be positioned in alignment with the film gate without releasing the locking mechanism. During subsequent film advancement the locking mechanism will function in the normal manner to meter the film advancement.

While the invention has been described in detail with particular reference to preferred embodiments thereof, it will be understood that variations and modifications can be effected within the spirit and scope of the invention herein described and as defined in the appended claims.

I claim:

1. In a photographic camera having a film gate and having a back housing portion movable between open and closed positions to facilitate the insertion of film into the camera, the combination comprising:
   means for advancing film relative to the film gate in predetermined advance steps corresponding to successive length sections of the film to be exposed;
   means for locking said film advancing means at the end of each advance step to positively define said advance steps; and
   means responsive to movement of the camera back portion from the open to the closed position thereof for increasing the initial advance step of the film whereby the first advance step is sufficient to position the first section of the film suitable for exposure in alignment with the film gate.

2. In a camera having a film gate relative to which a film is moved for exposure of successive sections of the film and having a back housing portion movable between open and closed positions relative to the camera to facilitate the insertion of film into the camera, the combination comprising:
   means for moving film relative to the film gate;
   film metering means movable in response to movement of the film;
   means responsive to movement of said film metering means corresponding to a section of the film to be exposed for locking said film moving means to prevent movement of the film;
   means responsive to movement of the camera back portion to a closed position for disabling said locking means to prevent locking of said film moving means; and
   means responsive to a predetermined movement of said film metering means after movement of the housing portion to a closed position to render said disabling means ineffective to disable said locking means whereby said locking means will lock said film moving means after a subsequent movement of said film metering means corresponding substantially to a section of the film to be exposed.

3. In a camera having a film gate relative to which film is moved for exposure of successive sections of the film and having a back housing portion movable between open and closed positions to facilitate the insertion of film into the camera, the combination comprising:
   means for moving film relative to the film gate;
   film metering means movable in response to movement of the film;
   lever means responsive to a predetermined movement of said film metering means for locking said film moving means to prevent movement of the film;
   means for releasing said first lever means to unlock said film moving means;
   second lever means responsive to movement of the camera back portion to a closed position for disabling said first lever means to prevent locking of said film moving means by said first lever means;
   cam means movable in response to movement of the film; and
   third lever means responsive to a predetermined movement of said cam means for actuating said second lever means to render the same ineffective to disable said first lever means whereby a subsequent predetermined movement of said metering means will cause said first lever to lock said film moving means.

4. In a camera including a film gate relative to which a film having a leader portion is moved for exposure of successive sections of the film and including a back housing portion movable between open and closed positions relative to the camera to facilitate the insertion of film into the camera, the combination comprising:
   a take-up spool adapted to have the film leader portion connected thereto and adapted to be rotated to wind the film thereon and to move the film relative to the film gate;
   film metering means rotatable in response to movement of the film;
   a first lever movable from a first position to a second position in response to a predetermined rotational displacement of said film metering means to lock said take-up spool against rotation, said first lever being movable from said second position to said first position to release said take-up spool;
   a second elongated lever supported for both pivotal and axial displacement and positioned to be engaged and displaced axially by the camera back portion when the camera back portion is moved from the open to the closed position thereof, to engage said first lever and prevent movement thereof to said second position;
   a rotatable cam coupled to said film metering means for rotation therewith;

a third lever movable in response to a predetermined angular displacement of said cam to engage and pivotally displace said second lever out of engagement with said first lever to free said first lever for pivotal displacement between said first and second positions thereof whereby a subsequent predetermined rotational displacement of said film metering means will cause said first lever to lock said take-up spool.

5. In a camera as claimed in claim 4 wherein the back housing portion has a recess therein and wherein one end of said second lever is adapted to be received by said recess in a first angular position of said second lever and biasing means are provided for biasing said second lever to a second angular position and toward engagement with said recess, said biasing means being effective to displace said second lever to said second position thereof when said back housing portion is moved from the closed to the open position thereof whereby subsequent movement of said housing portion from said open to said closed position thereof will displace said second lever axially in said second angular position thereof to a third position wherein it engages said locking lever and prevents movement thereof, said third lever being effective upon said predetermined angular displacement of said cam to displace said second lever from said third position to said first position thereof.

6. In a camera as claimed in claim 4 wherein said metering means comprises:
 a sprocket wheel adapted to be rotated by perforations in the film;
 a second rotatable cam coupled to said sprocket wheel and engaged by said first lever, said second cam having a generally circular periphery engaged by said first lever in said first position thereof and a recess in said surface engaged by said first lever in said second position thereof; and
 means for biasing said lever into engagement with said second cam.

7. In a camera as claimed in claim 6 further including:
 a ratchet wheel fixed to said take-up spool, said first lever defining a pawl adapted to engage said ratchet wheel in said second position of said second lever.

8. In a camera as claimed in claim 4 wherein said film metering means comprises:
 a sprocket wheel adapted to be rotated by perforations in the film; and
 a second rotatable cam coupled to said sprocket wheel for rotation therewith, said first cam being coupled to said second cam for rotation therewith.

9. In a camera as claimed in claim 8 wherein said third lever is biased into engagement with said second cam.

10. In a camera having a film gate and adapted to receive a strip of sensitized film having a leading portion and a portion to be exposed, the combination comprising:
 means for advancing the strip of film past the film gate;
 means for locking said advancing means after a predetermined length of the strip of film has been advanced past the film gate; and
 means responsive to loading the camera with a strip of film for disabling said locking means during initial advancement of the strip of film while the leading portion is advanced past the film gate to bring the portion of the strip of film to be exposed into alignment with the film gate, the leading portion advanced while said locking means is disabled being equal to at least two of said predetermined lengths of the strip of film.

11. In a camera having a film gate and adapted to receive a strip of sensitized film having a leading portion and portion to be exposed, the combintion comprising:
 means for advancing the strip of film past the film gate;
 means for locking said advancing means after a predetermined length of the strip of film has been advanced past the film gate;
 a member movable between a position preventing film loading; and
 means responsive to movement of said member for disabling said locking means during initial advancement of the strip of film while the leading portion is advanced past the film gate to bring the portion of the strip of film to be exposed into alignment with the film gate, the leading portion advanced while said locking means is disabled being equal to at least two of said predetermined lengths of the strip of film.

12. In a camera having a film gate and adapted to receive a strip of sensitized film, the combination comprising:
 means for advancing the strip of film past the film gate;
 means for metering the film movement past the film gate;
 means actuated by said metering means for locking said advancing means after a predetermined length of the strip of film has been advanced past the film gate; and
 means preventing said metering means from actuating said locking means while an initial length of the strip of film equal to at least two of said predetermined lengths is advanced past the film gate.

References Cited

UNITED STATES PATENTS

| | | |
|---|---|---|
| 2,632,369 | 3/1953 | Estes. |
| 2,721,506 | 10/1955 | Kindig. |
| 2,926,574 | 3/1960 | Bethmann _____ 95—31 |

NORTON ANSHER, Primary Examiner

D. S. STALLARD, Assistant Examiner